(No Model.) 5 Sheets—Sheet 1.

W. B. BROWN.
ENGINE.

No. 598,852. Patented Feb. 8, 1898.

Fig. 1.

Witnesses.
Robert Everett,
Dennis Sumby.

Inventor.
William B. Brown,
By James L. Norris.
Atty.

(No Model.) 5 Sheets—Sheet 4.

W. B. BROWN.
ENGINE.

No. 598,852. Patented Feb. 8, 1898.

Witnesses.
Robert Corrett.
Dennis Sumby.

Inventor:
William B. Brown,
By James L. Norris.
Atty.

(No Model.) 5 Sheets—Sheet 5.

W. B. BROWN.
ENGINE.

No. 598,852. Patented Feb. 8, 1898.

Witnesses.
Robert Everatt.
Dennis Sumby.

Inventor:
William B. Brown.
By James L. Norris
Atty.

THE NORRIS PETERS CO., PHOTO-LITHO., WASHINGTON, D. C.

UNITED STATES PATENT OFFICE.

WILLIAM B. BROWN, OF BALTIMORE, MARYLAND.

ENGINE.

SPECIFICATION forming part of Letters Patent No. 598,852, dated February 8, 1898.

Application filed May 4, 1897. Serial No. 635,037. (No model.)

*To all whom it may concern:*

Be it known that I, WILLIAM B. BROWN, a citizen of the United States, residing at Baltimore, in the State of Maryland, have invented new and useful Improvements in Engines, of which the following is a specification.

This invention relates to engines or motors, and has for its special objects the provision of certain improvements in the construction, arrangement, and combination of the parts comprised in a compound rotary steam-engine of large size and adapted for high pressures, as hereinafter more particularly set forth.

In the annexed drawings.

Figure 1:
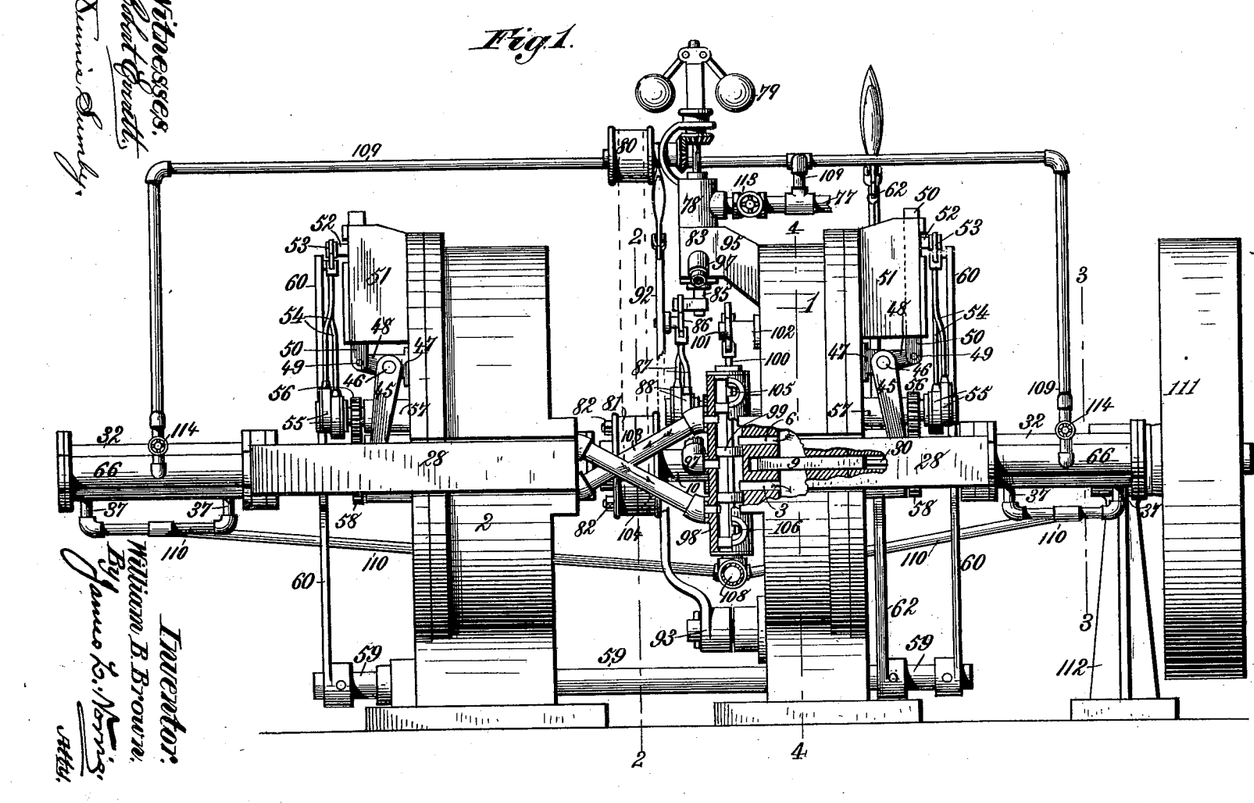
Figure 1 is a partly sectional elevation of my improved compound rotary engine.

In Fig. 1 is represented a two-cylinder rotary compound engine with auxiliary horizontally-placed reciprocating engines for operating the sliding gates or abutments that coact with the rotary pistons. The reference-numeral 1 designates the high-pressure cylinder, and 2 the low-pressure cylinder.

Figure 2:
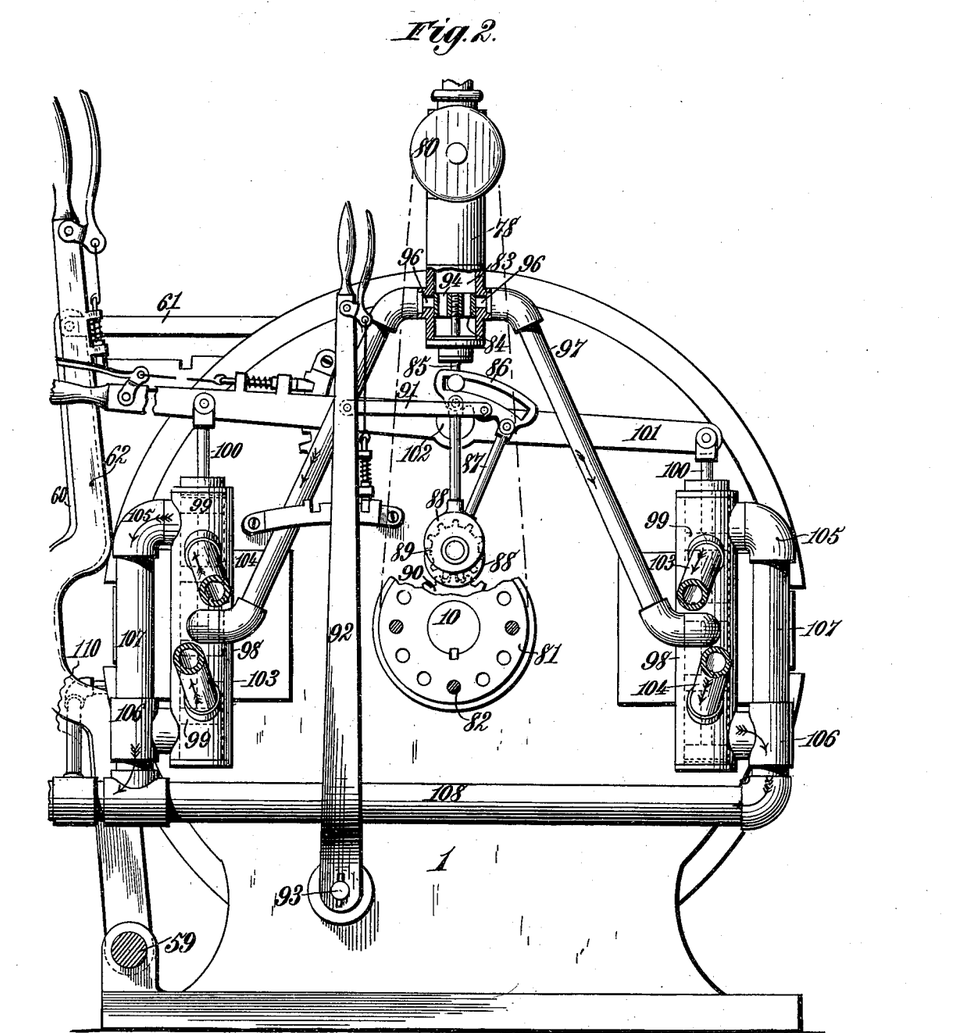
Fig. 2 is a view in vertical section on the line 2 2 of Fig. 1, showing the high-pressure cylinder in side elevation and the cut-off valve in vertical section.
Figure 3:
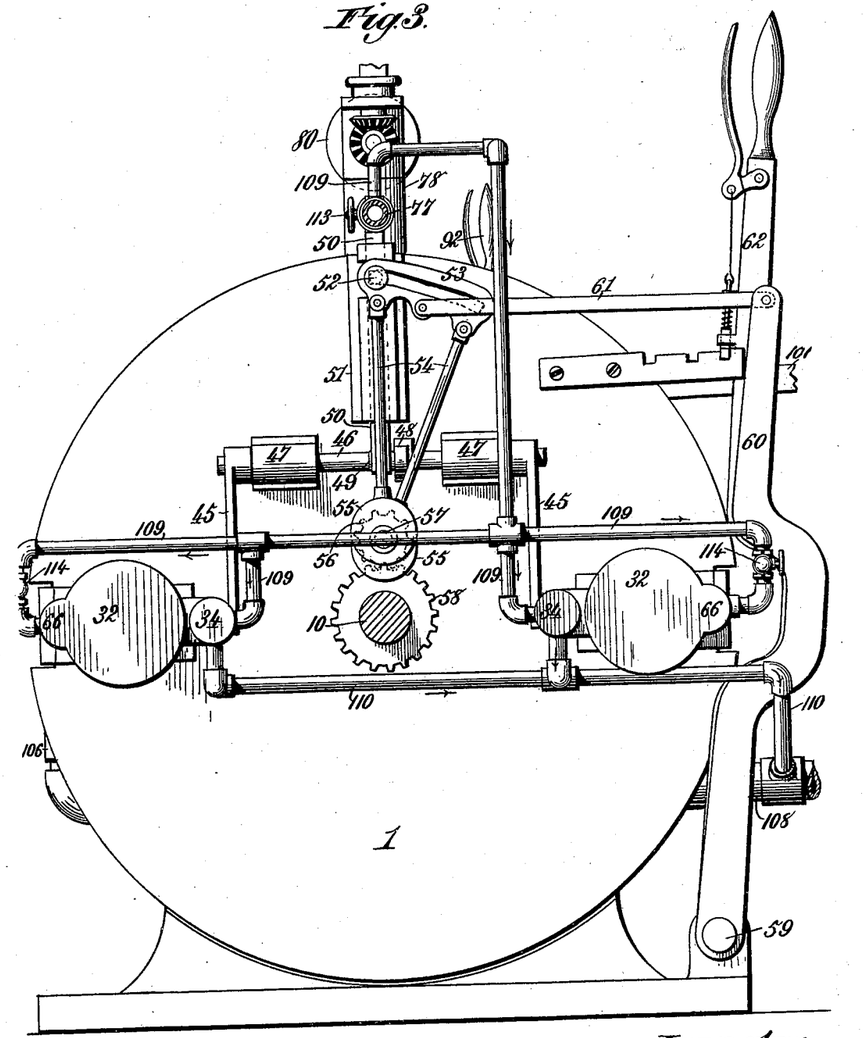
Fig. 3 is a view in vertical section, on the line 3 3 of Fig. 1, from the opposite side of the high-pressure cylinder.
Figure 4:
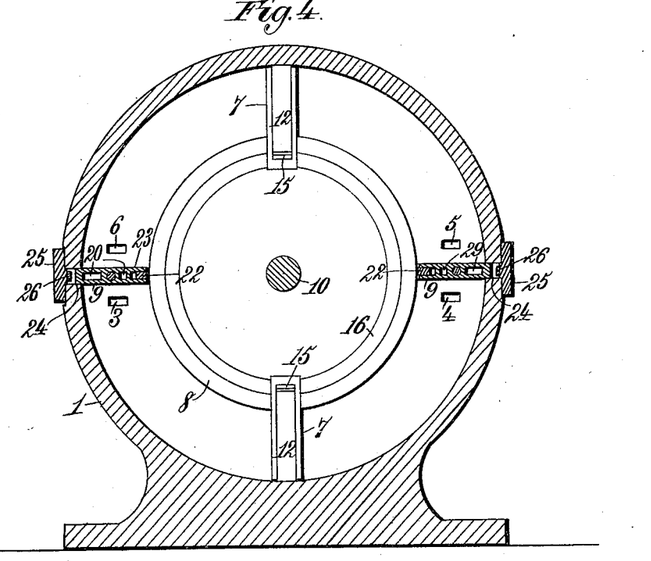
Fig. 4 is a vertical transverse section, on the line 4 4 of Fig. 1, through the high-pressure cylinder, showing the concentric rotary piston-body with its two radial pistons, blades, or vanes, and also a cross-section of two sliding gates or abutments that are arranged to reciprocate transversely of the rotary piston-body and parallel with the engine-shaft.

Figs. 2 and 3 represent opposite sides of the high-pressure cylinder, and Fig. 4 a vertical section through the said cylinder, showing its ports 3, 4, 5, and 6 arranged for admission and exhaust of steam or other working fluid for driving, preferably, two radial pistons or piston-blades 7, mounted in a rotary piston-body 8, that is concentric with the cylinder.

The cylinder-ports 3, 4, 5, and 6 are arranged below and above the paths of two horizontally-sliding gates or abutments 9, Figs. 1, 4, and 9, that are reciprocated transversely of the rotary piston-body 8 and parallel with the main-engine shaft 10, on which the said piston-body is mounted.

Figure 5:
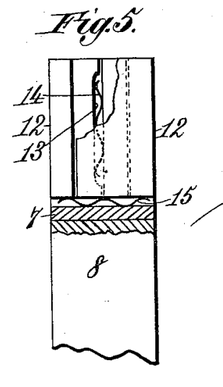
Fig. 5 is a partly sectional and partly broken detail view of the piston-body and a piston-blade and its inclosed spring-expanded packing plates or blocks.
Figure 6:
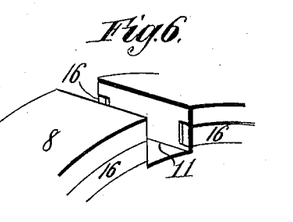
Fig. 6 is a perspective of a portion of the recessed periphery of the rotary piston-body.
Figure 7:
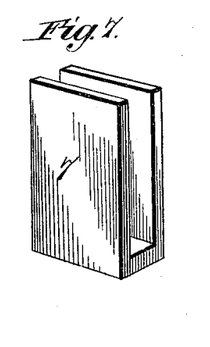
Fig. 7 is a perspective of a piston-blade with packing-blocks removed.
Figure 8:
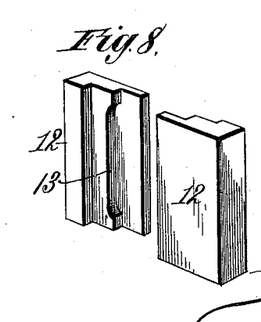
Fig. 8 is a perspective of the rabbeted and laterally-expansible packing-blocks for a piston-blade.

As shown in Figs. 4 and 6, the periphery of the rotary piston-body 8 is provided with recesses 11 at diametrically opposite points to receive the radial piston-blades 7, which are of rectangular form, as shown in Figs. 4 and 7. Each piston-blade 7 is slotted, as shown, being closed or solid at its inner end and also at its broader sides, which are presented to the pressure of working fluid. Its outer end and its narrower sides are open, as shown in Fig. 7, thus giving the said blade the form of a partly-open box for reception of laterally-expansible packing-blocks 12, Figs. 4, 5, 8, and 9. These packing-blocks 12 are rabbeted to have an overlapping and sliding engagement with each other and are suitably recessed, as at 13, Figs. 5 and 8, for reception of a spring or springs 14 to force the said blocks outward in lateral directions into close fluid-tight contact with the side walls of the cylinder in which the rotary piston is operated. In the bottom of each recessed or box-like piston-blade 7 is placed a spring 15, Figs. 4 and 5, to press the packing-blocks 12 endwise outwardly into close fluid-tight contact with the periphery of the cylinder.

Figure 9:
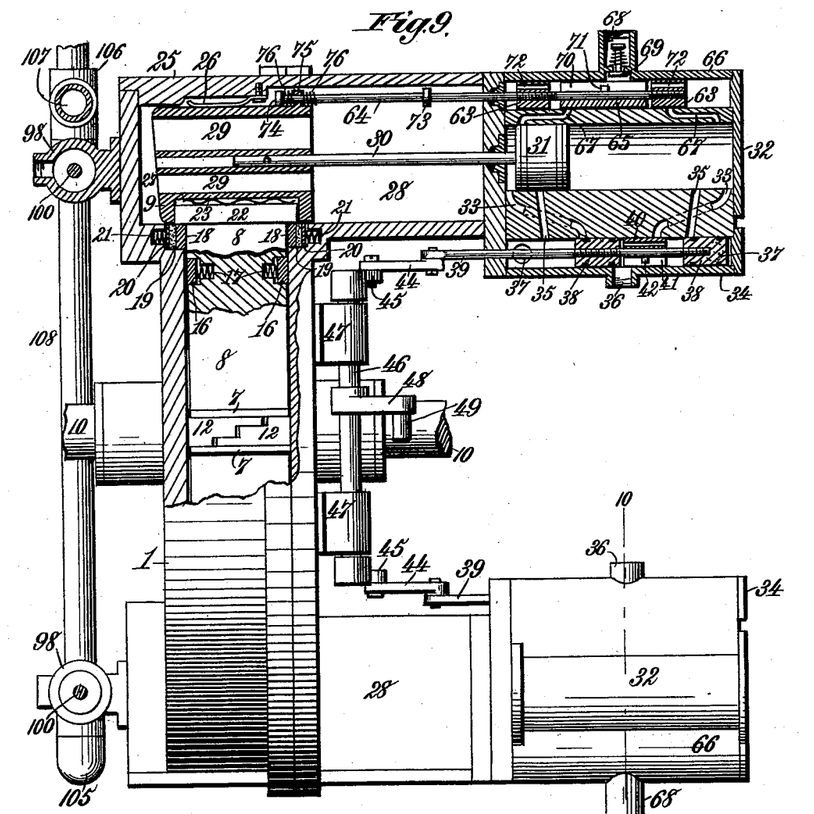
Fig. 9 is a partly sectional plan view of the high-pressure cylinder and its two auxiliary reciprocating engines for operating two sliding gates or abutments in proper relation to the required movements of two radial pistons or blades carried by the rotary piston-body.

The sides of the rotary piston-body 8 are provided with annular grooves, in which are placed packing-rings 16, Figs. 4, 6, and 9, with springs 17 at their back. In the side walls of the cylinder, at or adjacent to the periphery of the rotary piston-body, there are annular recesses or grooves for packing-rings 18, Fig. 9, preferably having elastic packing 19, followers 20, and springs 21 at the back. If desired, the packing carried by the rotary piston-body may be of the same character as that inserted in the cylinder-walls—namely, packing-rings with elastic packing at the back and pressed outward by means of followers and springs. By means of the spring-pressed packing provided for the piston-blades, piston-body, and cylinder-walls the escape or leakage of working fluid past the piston is effectually prevented.

As shown in Figs. 4 and 9, each sliding gate or abutment 9 is longitudinally grooved or recessed along the edge that moves across and in contact with the periphery of the rotary piston-body. A packing-strip 22, Figs. 4 and 9, is placed in this groove or recess of the gate edge, with a spring 23 at the back of said strip to secure fluid-tight contact between the sliding gate and the periphery of the rotary piston-body. As shown in Fig. 4, the periphery of the engine-cylinder is preferably cut through for insertion of the gates 9 and to form guideways 24 for each gate. A plate 25, Figs. 4 and 9, closes the opening thus made in the cylinder. The inner side of the plate 25 is grooved or countersunk to receive a substantially flat spring 26, Fig. 9, which is secured at one end to the said plate and bears for the greater part of its length against the outer edge of the sliding gate 9 to force it into close contact with the periphery of the rotary piston-body. In order to provide for a full closing stroke of each sliding gate 9 without risk of collision with the cylinder-wall, there is provided a chamber 27, Fig. 9, in the farther side wall of the cylinder. This chamber 27 is practically a continuation of a housing 28, Figs. 1 and 9, in which the sliding gate 9 is reciprocated. In the body of the sliding gate 9 are longitudinal passages 29, Fig. 9, to lessen the momentum and inertia of the gate and permit a free flow of any steam or working fluid that may gain access to the said chamber and gate-housing.

By reference to Fig. 4 it will be seen that the piston-blades 7 are so much thicker than the sliding gates 9 that when the said gates are withdrawn or opened the passing piston-blades or their packing cannot possibly spring into the gate-guideways 24 nor come in contact with the springs 26 in their countersunk recesses.

Each sliding gate or abutment 9 is secured to and actuated by a piston-rod 30, Figs. 1 and 9, carried by the piston-head 31 of an auxiliary horizontally-arranged and double-acting reciprocating engine 32, secured to the housing 28, in which the said gate or abutment is reciprocated. In a two-pistoned rotary compound engine with two sliding gates or abutments for each rotary piston-body there will be provided four reciprocating auxiliary or gate-operating engines 32, as shown, all of which are of like construction.

Figures 10, 11:
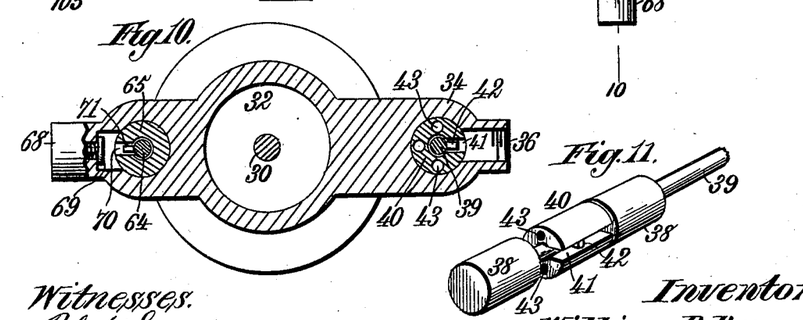
Fig. 10 is a section, on the line 10 10 of Fig. 9, transversely through an auxiliary engine and its valve-chests.
Fig. 11 is a perspective of the main valve of auxiliary engine.

By referring to Fig. 9 it will be seen that the auxiliary engine 32 is provided with two inlet-ports 33, connecting the ends of the engine-cylinder with the central portion of a valve-chest 34, that is adapted to receive the exhaust from the engine-cylinder through two exhaust-ports 35, which communicate with the cylinder and valve-chest in such manner as to provide for cushioning the piston 31 at the end of its stroke in each direction by aid of the valve mechanism that controls admission and exhaust of steam or other working fluid for driving the gate-operating piston in both directions of its movement. The valve-chest 34 is provided with a centrally-located inlet-port 36 and with exhaust-ports 37, located near the ends of the said chest, as shown. In the valve-chest 34 there is a slide-valve consisting of two piston-heads 38, secured to the valve-stem 39 at a suitable distance apart and having between them a cut-off sleeve 40, that is loose on the valve-stem and which is pushed first in one direction and then in the other by the heads 38, between which it is placed. As shown in Figs. 9, 10, and 11, the cut-off sleeve 40 is loose on the valve-stem 39, to which the valve-heads 38 are secured. In one side of the cut-off sleeve 40 there is a longitudinal groove or channel 41, and in order that this groove 41 may be always presented toward the valve-chest inlet 36 there is carried on the valve-stem 39 a pin 42, that projects into the groove or channel 41 and thereby prevents the sleeve 40 from turning. The cut-off sleeve or block 40 is provided with longitudinal passages 43, as shown in Figs. 9, 10, and 11, in order to lessen the momentum of the sleeve or block and prevent the trapping and compression of steam or working fluid between it and the fixed heads 38 of the slide-valve.

A link 44, Fig. 9, connects the valve-stem 39 with the lower end of a crank-arm 45, Figs. 1 and 3, on a rock-shaft 46, supported in bracket-bearings 47, secured to the cylinders 1 and 2 or other convenient support. On the rock-shaft 46 is a crank-arm 48, having a wrist-pin 49, Fig. 9, engaged in a perforation in the lower end of a vertical slide 50, Figs. 1 and 3, supported in a guide-bracket 51 on the cylinder or frame of the rotary engine. The guideway 51 is slotted, as shown in Figs. 1 and 3, for passage of a pin 52, connecting the vertically-movable slide 50 with a slotted link 53, that is connected through eccentric-rods 54 with two eccentrics 55, carried by a pinion 56, that is mounted on a stud 57, and which is driven by a gear 58, secured to the main shaft 10 of the engine. Thus as there are two radial piston-blades 7 and two reciprocating gates 9 for each rotary piston-body provision is made through the multiplying-gears 58 and 56 for operating the valve mechanism of the auxiliary engines 32 at each half-revolution of the main-engine shaft.

In order to provide for reversing the described valve-gear mechanism of the auxiliary engine 32, there is provided a rock-shaft 59, Figs. 1, 2, and 3, supported in suitable bearings at the base of the rotary or main engine cylinders. The ends of this rock-shaft 59 carry vertical arms 60, that connect by rods or bars 61 with the slotted links 53, as shown in Fig. 3. On the rock-shaft 59 there is a hand-lever 62, Figs. 1 and 3, that provides means for actuating the arms 60, bars 61, slotted links 53, and connected eccentric mechanism for reversing or setting the valve mechanism of the auxiliary engines 32 according to the requirements of the main engine. This hand-lever 62 may be provided with the usual locking attachments, as shown.

As a means for operating the sliding gates 9 the double-acting auxiliary engines 32 offer the advantages of cheapness in construction, economy in the use of steam or working fluid, freedom from jar or concussion, and rapid positive action. The reciprocating piston 31 and connected gate 9 travel with lightning-like rapidity to accord with the requirements of a high-speed rotary engine; but by reason of the arrangement given to the ports of the engine-cylinder 32 and valve-chest 34 and the positive cut-off afforded by the sleeve 40 the consumption of steam or working fluid is economized and the piston 31 is effectively cushioned in both directions of its movement and without any risk of jar or concussion. It is found by experience that the piston 31 cushions with more force when the gate 9 is closing than when opening, for in closing the gate the piston starts with no appreciable friction and quickly attains a high velocity. Without the cut-off sleeve 40 the inlet-port to the engine-cylinder would open quicker and stay open about three times as long as the corresponding port that admits working fluid to act on the piston in its return movement for opening the gate. There is no friction on the gate 9 until it is closed and thereby subjected to pressure of working fluid in the cylinder that incloses the rotary piston. On the opening stroke the inlet-port opens slower, not so far nor long, and the gate 9 starts under greater resistance, owing to being held against its guideways by pressure of the working fluid in the cylinder of the rotary engine. In order to decrease the driving force of the closing stroke, avoid concussion, and also economize working fluid, the cut-off sleeve 40 is provided and arranged for operation by the heads 38 of the slide-valve.

When high pressures are employed, it is necessary to either increase the length of the cushioning-chamber or increase the cushioning resistance in the cylinder of the auxiliary engine 32 proportionately to increase of pressure on the working face of the piston 31 in the cylinder of said engine. For this purpose there is provided a supplementary gate-operated valve, comprising piston-heads 63, Fig. 9, secured to a valve-stem 64 at a suitable distance apart and having between them a cut-off sleeve 65, that is loose on the valve-stem. This valve operates in a supplemental chamber or chest 66, that is adapted to communicate with the cylinder of the engine 32 through ports 67, Fig. 9, controlled by said valve and its cut-off sleeve. The valve chest or chamber 66 is provided with an inlet 68 for steam or working fluid, and within this inlet a check-valve 69 is preferably placed. The cut-off sleeve has in one side a longitudinal groove or channel 70, Figs. 9 and 10, and on the valve-stem 64 is carried a pin 71, projecting into said groove or channel to prevent the loose cut-off sleeve from turning and to cause its said channel or groove 70 to be always presented to the inlet for working fluid. In each valve-head 63 there is a longitudinal passage 72 to prevent compression of any working fluid that may pass to the ends of the valve chest or chamber 66, as said chamber has no exhaust other than through the ports 67, that communicate with the engine-cylinder. It will be seen that the construction of this supplementary cushioning-valve is similar to the main slide-valve of the auxiliary engine 32, except that the cut-off sleeve or block 65 is longer than the cut-off sleeve or block 40, while the valve-heads 63 are provided with longitudinal passages 72, and are somewhat shorter than the heads 38 of the main valve. The stem 64 of the supplementary valve is extended into the housing 28 of the sliding gate 9 and is provided with collars 73 and 74 at suitable intervals, through which the said supplementary valve is operated in both directions from the gate 9 by means of a tappet 75, carried on the outer edge of the gate, said tappet being perforated for passage of the valve-stem, as shown in Fig. 9. On the valve-stem 64, at each side of the tappet 75, there are placed spiral springs 76 to lessen the shock of impact between the tappet and the valve-stem collars.

It is not necessary to have the supplementary gate-operated valve 63 65 for admitting cushioning steam or fluid to the cylinder of the engine 32 if the cushioning-chamber of said cylinder can with convenience be made sufficiently long. The chief advantage of this valve is to permit a shorter cushioning-chamber, in that it increases the cushioning resistance directly as the pressure on the working face of the piston 31 increases. The fluid compressed or trapped in the cushioning-chamber or end of the engine-cylinder is not lost or dead, but is ready, like a spring, to give forth power the moment the pressure on the opposite side of the piston is relieved by the opening-exhaust. The moment the piston 31 covers exhaust-port 35 the supplementary valve 63 65 is open through its operation by the gate 9 and admits steam or fluid at the same pressure as that delivered through the main valve 38 40 for driving the engine-piston, thereby offering greater resistance to the movement of the piston and obviating shock at the end of its stroke. In the cushioning act there is a point where the pressure in the cushioning-chamber of the engine-cylinder exceeds the driving force by reason of the momentum acquired by the moving parts—piston and gate. To avoid this back pressure, the cut-off is made by means of the sleeve 65 on the supplementary valve and later in stroke by the piston covering the port 67, and as an additional precaution against back pressure the check-valve 69 is provided at the inlet-port. It is my intention to use this supplementary valve 63 65 only when high pressures are used.

Besides the advantages of simplicity and cheapness in construction of the auxiliary engines 32, the arrangement and formation of the valves give large economy in the use of steam or other working fluid, free exhaust, positive action of the valves, but little friction, and effective means for increasing the cushioning resistance as the driving force on the piston increases. As shown by experiment, under fifty pounds' working pressure and with the engine making sixty revolutions per minute the closing of the sliding gates or abutments is practically instantaneous after the rotary pistons have passed. The object of employing two gates and two radial pistons with each rotary piston-body is to equalize the pressure on the piston-body, and it also increases the power in that the pressure obtained is twice that on a single piston. Outside of the increase in power it is a most desirable object to get rid of the excessive and unequal pressure on the engine-shaft as exists in a single-piston engine, for during a portion of the stroke in such an engine the pressure is on one side only.

Referring to Fig. 1, the number 77 designates a main supply-pipe for steam or other suitable working fluid. This steam-supply pipe 77 communicates with a chamber 78, in which is arranged a governor-valve (not shown) controlled by a governor 79, driven through a pulley 80, to be suitably belted to a pulley 81 on the main-engine shaft. This pulley 81, Figs. 1 and 2, may be constructed in two parallel halves or in the form of two flanged disks, each secured to one portion or section of a divided main shaft 10 in a compound engine. Bolts 82 are provided for rigidly connecting the said pulley halves or disks after the sections of the engine-shaft have been axially shifted to any desired degree for adjusting the rotary pistons of the high-pressure cylinder 1 and low-pressure cylinder 2 with required relation to each other.

Below the governor-valve chamber 78 there is a cut-off-valve chamber 83, Figs. 1 and 2, inclosing a main cut-off valve 84, having a depending stem 85, the lower end of which is connected in a well-known manner with a slotted link 86, Fig. 2, to which are attached eccentric-rods 87, connecting with two eccentrics 88 on a suitably-mounted pinion 89, that is driven from a gear-wheel 90, secured to the main-engine shaft. A bar or rod 91, Fig. 2, connects the slotted link 86 with a hand-lever 92 for shifting the said link to vary the cut-off. This hand-lever 92 is fulcrumed at 93 and is provided with the usual locking attachments. As shown in Fig. 2, the cut-off valve 84 is provided with longitudinal bores 94 to prevent compression of working fluid in the valve-chamber.

The cut-off-valve chamber 83 and governor-valve chamber 78 are supported by a bracket 95, Fig. 1, on one side of the high-pressure cylinder.

Referring to Fig. 2, it will be seen that the opposite sides of the cut-off-valve chamber 83 are provided with ports 96, communicating with pipes 97, that connect with the casings or chambers 98 of two main reversing-valves 99, Figs. 1 and 2, each of which comprises a valve-stem 100 with a plurality of piston-heads thereon, the valves being preferably of the four-pistoned variety, as shown. These reversing-valves are placed in substantially vertical positions to accord with the operation of the sliding gates 9 in horizontal planes, as here arranged. The upper ends of the valve-stems 100 are connected by a two-armed lever 101, centrally fulcrumed at 102 and so arranged that when the said lever is shifted one valve will be adjusted upward and the other downward, or vice versa. This lever 101 is provided with suitable locking attachments, as shown. The reversing-valve chambers or casings 98 communicate with the high-pressure cylinder 1 through the ports 3, 4, 5, and 6, Fig. 4, hereinbefore mentioned. In driving the rotary engine in one direction the inlet of steam or working fluid to the high-pressure cylinder takes place from one reversing-valve through the port 3, Figs. 1 and 4, below one of the sliding gates 9, and from the other reversing-valve through the port 5, Fig. 4, above the other sliding gate. The working fluid admitted through the port 3 from one reversing-valve finds its exhaust through the port 4, Fig. 4, to the other reversing-valve, and conversely the working fluid admitted at the port 5 escapes at the port 6, Figs. 1 and 4. To drive the engine in an opposite direction, the reversing-valves 99 are so set as to admit working fluid to the high-pressure cylinder at the ports 4 and 6 and exhaust at the ports 3 and 5, as will be readily understood.

The exhaust from the high-pressure cylinder 1 is directed by the reversing-valves 99 through pipes 103, Figs. 1 and 2, into the low-pressure cylinder 2, that is provided with a rotary piston having two radial piston-blades coacting with two sliding gates or abutments operating in horizontal planes, the said piston and gates being of the same construction and mode of operation as already described with reference to the piston and sliding gates of the high-pressure cylinder.

The exhaust from the low-pressure cylinder 2 passes through pipes 104, Figs. 1 and 2, into the upper and lower end portions, respectively, of the chambers 98, that inclose the reversing-valves. It will be understood that when the valves 99 are reversed the pipes 104 will constitute the inlets to the low-pressure cylinder 2, and the pipes 103 will then conduct the exhaust from said low-pressure cylinder to the reversing-valves.

The upper and lower end portions of the reversing-valve casings 98 are provided with elbow or T connections 105 106, connected by pipes 107, as shown in Fig. 2. Through these connections the exhaust-discharging ends of the reversing-valves communicate with a pipe 108, Figs. 1, 2, 3, and 9, for final exhaust.

From the main supply-pipe 77, Fig. 1, for steam or working fluid there may be carried branch pipes 109, Figs. 1 and 3, to the inlet-ports 36 and 68, Fig. 9, of the valve-chests on the auxiliary engine 32, which have their exhaust-ports 37 connected by pipes 110 to the final exhaust-pipe 108, as shown in Figs. 1, 2, and 3.

The main shaft of the engine may be extended a sufficient distance to provide for carrying on its end a fly-wheel 111, Fig. 1, or any suitable band wheels or pulleys for taking off power, and as an additional support for the extended shaft a pedestal 112 may be provided.

In the main steam-supply pipe 77 there is preferably placed a hand-valve 113, Fig. 1, located between the governor-valve casing 78 and the connection of pipe 77 with the branch pipes 109, that conduct steam to the auxiliary engines 32, and thus by means of this valve 113 working pressure can be shut off from the main engine without affecting the operation of the auxiliary engines except as they are controlled by their valves 38, actuated from the main-engine shaft. The supply of working fluid to the branch pipes 109 will be cut off when necessary by means of a valve (not shown) located near the steam-boiler or other source of working pressure. As the working pressure for the auxiliary engines is thus independent of that for the main engine and as the valves 38 of the gate-actuating engines are controlled from the main-engine shaft, it will be obvious that a sudden loss of pressure in the main engine will not incur risk of collision between the sliding gates and the rotary pistons while the latter continue to revolve by momentum.

In the inlet-pipe to each supplementary valve-chest 66 there is a hand-valve 114, Fig. 1, to cut off supply of working fluid when increase of cushioning resistance for the pistons of the auxiliary engines is deemed unnecessary.

What I claim as my invention is—

1. In an engine, the combination with a cylinder, and a rotary piston-body concentric with the cylinder and provided with a radial piston-blade, of a gate housing or chamber communicating with the cylinder, a sliding gate or abutment mounted in said housing to reciprocate across the periphery of the rotary piston-body and parallel with the engine-shaft, the said gate having in one edge a spring-pressed packing-strip to contact with the periphery of the rotary piston-body, a spring arranged in a countersunk recess of the cylinder periphery to press the sliding gate toward the rotary piston-body, an auxiliary double-acting engine provided with inlet and exhaust ports and having its piston in operative connection with the sliding gate, and a valve for the auxiliary engine actuated from the shaft of the rotary engine and provided with means for cutting off the exhaust of working fluid before the piston reaches the limit of its stroke, whereby the said piston of the auxiliary engine is cushioned in both directions of its movement, substantially as described.

2. In an engine, the combination with the cylinder having a rotary piston-body provided with a radial piston-blade, and the sliding gate or abutment, of an auxiliary double-acting engine having its piston in operative connection with said sliding gate, a valve-chest having a central inlet-port and end exhaust-ports and communicating with the end portions of the auxiliary-engine cylinder through inlet-ports and exhaust-ports, a valve comprising a stem having fixed heads or pistons thereon and a loose longitudinally-sliding cut-off sleeve intermediate said piston-valve heads, and mechanism for actuating said valve of the auxiliary engine from the shaft of the rotary engine, to drive the double-acting gate-operating piston by fluid-pressure in both directions of its movement and control the exhaust of working fluid to cushion said piston at the end of its stroke in each direction, substantially as described.

3. In an engine, the combination with a cylinder, a rotary piston-body having a radial piston-blade, and a sliding gate or abutment, of an auxiliary double-acting engine having its piston in operative connection with said sliding gate, a valve-chest having a central inlet-port and end exhaust-ports and communicating with the cylinder of the auxiliary engine through inlet-ports and exhaust-ports, a valve comprising a stem having fixed heads or pistons thereon and a loose longitudinally-sliding cut-off sleeve intermediate said piston-valve heads, mechanism for actuating said valve of the auxiliary engine from the shaft of the rotary engine, to drive the double-acting gate-operating piston in both directions of its movement by fluid-pressure and control the exhaust of working fluid to cushion said piston at the end of its stroke in each direction, a supplementary valve-chest having an inlet-port and communicating through ports with the end portions of the auxiliary-engine cylinder, and a supplementary valve actuated intermittently from the sliding gate and comprising a stem having fixed piston-heads thereon and a loose longitudinally-sliding cut-off sleeve intermediate said heads, the said valve being adapted to control an increase of cushioning resistance for the gate-operating piston in proportion to increase of pressure on the working face of said piston, substantially as described.

4. In an engine, the combination of a cylinder, a rotary piston-body concentric with the cylinder and provided with two radial piston-blades, two sliding gates arranged to reciprocate across the periphery of the rotary piston-body parallel with the engine-shaft, two auxiliary gate-operating engines each having a double-acting piston in operative connection with a sliding gate, valves for the auxiliary engines, valve-chests communicating with the auxiliary-engine cylinders through inlet and exhaust ports and each of said valve-chests being also provided with an inlet-port and exhaust-ports, a rock-shaft provided with crank-arms, links connecting said crank-arms with the stems of the said valves of the auxiliary engines, an arm projecting from said rock-shaft and provided with a wrist-pin, a vertically-movable slide connected with said wrist-pin to actuate the rock-shaft, a slotted link connected with said slide, eccentrics connected with the main-engine shaft through multiplying gear and pinion, eccentric-rod connections from the said eccentrics to the said slotted link, and lever mechanism connected with said slotted link for shifting the eccentrics, substantially as described.

5. In an engine, the combination of a cylinder, a rotary piston-body provided with two radial piston-blades, two sliding gates, two auxiliary gate-operating engines each having a double-acting piston in operative connection with a sliding gate, valves for the said auxiliary engines, valve-chests communicating with the auxiliary-engine cylinders through inlet-ports and exhaust-ports, each of said valve-chests being also provided with an inlet-port and exhaust-ports, means for actuating said valves from the main shaft of the rotary engine at each half-revolution of said shaft to drive the gate-operating pistons by fluid-pressure in both directions of piston movement and control the exhaust from the auxiliary-engine cylinders for cushioning the stroke of the pistons in both directions, supplementary valve-chests having central inlet-ports and provided with ports communicating with the end portions of the auxiliary-engine cylinders, supplementary valves comprising valve-stems having fixed piston-heads thereon and an intermediate loosely-sliding cut-off sleeve to control increase of cushioning pressure in the auxiliary-engine cylinders in proportion to increase of pressure on the working faces of the gate-operating pistons, collars on said valve-stems, tappets on the sliding gates loosely engaging the valve-stems between said collars, and buffer-springs between the said tappets and collars, substantially as described.

6. In an engine, the combination of a high-pressure cylinder and a low-pressure cylinder, each provided with a rotary piston-body having two radial piston-blades, sliding gates or abutments adapted and arranged to reciprocate in horizontal planes across the periphery of each rotary piston-body and parallel with opposite sides of the main-engine shaft, auxiliary engines having double-acting pistons in operative connection with said sliding gates, main valves for the auxiliary engines actuated from the main-engine shaft at each half-revolution of said shaft to drive the gate-operating pistons and control the exhaust for cushioning the strokes of said pistons, supplementary valves for the auxiliary engines actuated from the sliding gates to control an increase of cushioning resistance for the gate-operating pistons proportionately to increase of pressure on the working faces of said pistons, two reversing-valves for the high-pressure cylinder communicating therewith through ports above and below the paths of the sliding gates in said cylinder, two sets of crossed pipes connecting the said reversing-valves with the low-pressure cylinder above and below the paths of the sliding gates therein, and a main cut-off valve adapted to communicate with the two reversing-valves and actuated from the main shaft of the engine at each half-revolution of said shaft, substantially as described.

7. In an engine, the combination of the high-pressure cylinder, the low-pressure cylinder, each having a rotary piston-body provided with two radial piston-blades, two sliding gates in each of said cylinders, auxiliary gate-operating engines provided with valves that are actuated from the main-engine shaft at each half-revolution of said shaft to drive the gate-operating pistons and effect a cushioning of said pistons at the ends of their strokes in each direction, two reversing-valves communicating with the high-pressure cylinder through ports at opposite sides of the paths of the sliding gates in said cylinder, crossed pipes connecting the said reversing-valves with the low-pressure cylinder, a main cut-off valve adapted to communicate with both reversing-valves and actuated from the main shaft of the engine at each half-revolution of said shaft, and a governor, substantially as described.

In testimony whereof I have hereunto set my hand in presence of two subscribing witnesses.

WILLIAM B. BROWN.

Witnesses:
PHILIP N. TILDEN,
HOWARD M. NORRIS.